US010759284B2

(12) United States Patent
Jaensch et al.

(10) Patent No.: US 10,759,284 B2
(45) Date of Patent: Sep. 1, 2020

(54) BATTERY MODULE FOR A TRACTION BATTERY

(71) Applicant: Dr. Ing. h.c. F. Porsche Aktiengesellschaft, Stuttgart (DE)

(72) Inventors: Malte Jaensch, Bietigheim-Bissingen (DE); Patrick Leidig, Stuttgart (DE); Stefan Götz, Forstern (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 78 days.

(21) Appl. No.: 16/130,038

(22) Filed: Sep. 13, 2018

(65) Prior Publication Data

US 2019/0100112 A1 Apr. 4, 2019

(30) Foreign Application Priority Data

Sep. 29, 2017 (DE) .................. 10 2017 122 661

(51) Int. Cl.
*B60L 50/64* (2019.01)
*H01M 2/10* (2006.01)
(Continued)

(52) U.S. Cl.
CPC ............... *B60L 50/64* (2019.02); *B60L 58/26* (2019.02); *H01M 2/1077* (2013.01); *H01M 2/206* (2013.01); *H01M 10/425* (2013.01); *H01M 10/613* (2015.04); *H01M 10/625* (2015.04); *H01M 10/647* (2015.04); *H01M 10/653* (2015.04); *H01M 10/6551* (2015.04); *H01M 10/6554* (2015.04); *H01M 10/6555* (2015.04);
(Continued)

(58) Field of Classification Search
None
See application file for complete search history.

(56) References Cited

U.S. PATENT DOCUMENTS

2012/0104843 A1 5/2012 Füchtner
2012/0152186 A1 6/2012 Sujan et al.
(Continued)

FOREIGN PATENT DOCUMENTS

CN 106130408 A 11/2016
DE 102011012723 A1 8/2012
(Continued)

OTHER PUBLICATIONS

Goetz et al., "Modular Multilevel Converter with Series and Parallel Module Connectivity: Topology and Control", IEEE Transactions on Power Electronics, vol. 30, No. 1, Jan. 2015—pp. 203-215.
(Continued)

*Primary Examiner* — Sarah A. Slifka
(74) *Attorney, Agent, or Firm* — RatnerPrestia

(57) ABSTRACT

A battery module for a traction battery having a housing, battery cells arranged inside the housing, a power electronics circuit board which is adjacent to the battery cells, a support face, facing away from the power electronics circuit board, for a cooling plate of the traction battery, and a heat-conducting element which bears over a surface on the power electronics circuit board and runs between the battery cells in the direction of or along the support face. Also described is a corresponding method for manufacturing a battery module, a corresponding traction battery and a corresponding electric car.

16 Claims, 11 Drawing Sheets

(51) Int. Cl.
*H01M 10/613* (2014.01)
*H01M 10/6554* (2014.01)
*H01M 10/625* (2014.01)
*H01M 2/20* (2006.01)
*H01M 10/66* (2014.01)
*B60L 58/26* (2019.01)
*H01M 10/647* (2014.01)
*H01M 10/667* (2014.01)
*H01M 10/653* (2014.01)
*H01M 10/6555* (2014.01)
*H01M 10/42* (2006.01)
*H01M 10/6551* (2014.01)

(52) U.S. Cl.
CPC ......... *H01M 10/66* (2015.04); *H01M 10/667* (2015.04); *H01M 2220/20* (2013.01)

(56) References Cited

U.S. PATENT DOCUMENTS

2016/0226421 A1    8/2016   Kadry et al.
2016/0318370 A1   11/2016   Rawlinson

FOREIGN PATENT DOCUMENTS

| DE | 102013020961 A1 | 6/2015 |
| DE | 102014009772 A1 | 1/2016 |
| JP | 2015050057 A | 3/2015 |

OTHER PUBLICATIONS

Japanese Notice of Reasons for Refusal for Japanese Application No. 2018-180022, dated Dec. 11, 2019, 5 pages.
Korean Notice of Preliminary Rejection for Korean Application No. 10-2018-0113537, dated May 14, 2020, 3 pages.

BATTERY MODULE FOR A TRACTION BATTERY

CROSS-REFERENCE TO RELATED APPLICATION

This application claims priority to German Patent Application No. DE 10 2017 122 661.3, filed Sep. 29, 2017, which is incorporated by reference herein in its entirety.

FIELD OF THE INVENTION

The present invention relates to a battery module for a traction battery. The present invention also relates to a corresponding method for manufacturing a battery module, to a corresponding traction battery and to a corresponding electric car.

BACKGROUND OF THE INVENTION

Multilevel converters are used in power electronics to generate a multilevel, "stepped" voltage which has only small harmonics portions even at a low pulse frequency of the power semiconductors which are used, without costly LC filters. The topology and control of the modular multi-level converters, which optionally permit a series connection and parallel connection of their modules are explained to a certain degree in GOETZ, Stefan M.; PETERCHEV, Angel V.; WEYH, Thomas. Modular multilevel converter with series and parallel module connectivity: Topology and control. *IEEE Transactions on Power Electronics,* 2015, 30th year, No. 1, pp. 203-215, which is incorporated by reference herein.

Multilevel converters of the generic type permit, for example, the conventionally hard-wired battery packs to be divided up structurally into battery modules of the same type in such a way that the electrical connection of the individual parts can be changed dynamically during operation. In particular in the case of large batteries as in electric vehicles or network storage units there is a trend toward such formation of modules. Any electronics present are usually mounted in these modules on an upper or lateral face.

Batteries with multilevel converters which are integrated in such a way or similarly complex power electronics therefore have two heat sources: on the one hand the battery cells heat up owing to their considerable internal resistance both when charging and discharging; on the other hand, the power electronics themselves conduct large currents through electronics components which generate additional conduction losses and switching losses. This additional heat source in the electronics is not provided in conventional battery concepts.

The battery cooling system therefore determines to a high degree the power of an electric vehicle. In the case of electric cars according to the prior art, a costly liquid cooling system is therefore sometimes used, which cools the batteries. DE102013020961, which is incorporated by reference herein, describes such a battery system which comprises a power electronics component or a power electronics assembly for switching an electric load on and off, having a coolant circuit between the electronics and the battery. CN106130408, which is incorporated by reference herein, also discloses vehicle power electronics which are coupled to the battery for the purpose of cooling. A common coolant circuit for vehicle battery and power electronics is also mentioned in DE102011012723, DE102014009772, US2012104843, US2012152186, US2016226421 and US2016318370, all of which are incorporated by reference herein.

SUMMARY OF THE INVENTION

Described herein is a battery module for a traction battery, a corresponding method for manufacturing a battery module, a corresponding traction battery and a corresponding electric car.

Power electronics to be coupled thermally to the battery cells, for which powerful cooling concepts are in turn known. The technical implementation described below therefore gives rise to only small additional expenditure in terms of costs, installation space and weight.

In this respect, the proposed solution described herein advantageously makes use of the thermal properties of the two heat sources. The thermal energy which is additionally generated by the power electronics can therefore be compensated by the cells and their cooling system very easily and does not require any, or only a small degree of boosting of the cooling system.

The different thermal operating windows of electronics and battery cells provide a high temperature gradient which—assuming suitable structural measures—ensures a sufficiently strong flow of heat from the electronics into the cells. According to aspects of the invention, the heat from the electronics which occurs in a relatively concentrated form is therefore distributed over a relatively large area and output to the battery cells over a large area.

Therefore, in the case of a lateral circuit board arrangement (and preferably cooling at least from below) the heat-conducting element which serves for the described coupling can be correspondingly configured. This embodiment contributes, under certain circumstances, to reducing the number of punching-out operations which are necessary for connection points of the battery cells.

Of course, the invention can be used in any battery with a plurality of cells and electronics, in which in addition to the battery cells the electronics also output heat and the electronics optimally have a higher upper limiting temperature.

BRIEF DESCRIPTION OF THE DRAWINGS

Exemplary embodiments of the invention are illustrated in the drawings and are described in more detail below.

DETAILED DESCRIPTION OF THE INVENTION

Figure 1:
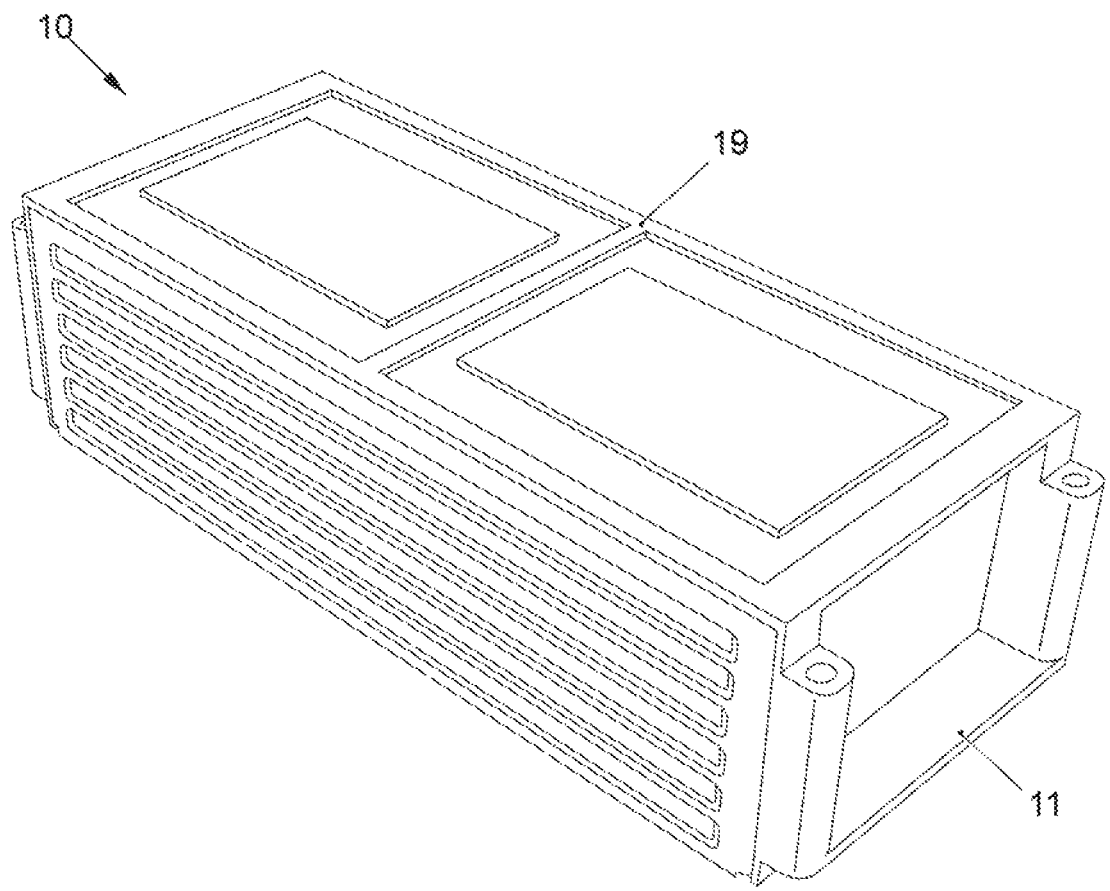
FIG. 1 shows the perspective view of a first battery module.
Figure 2:
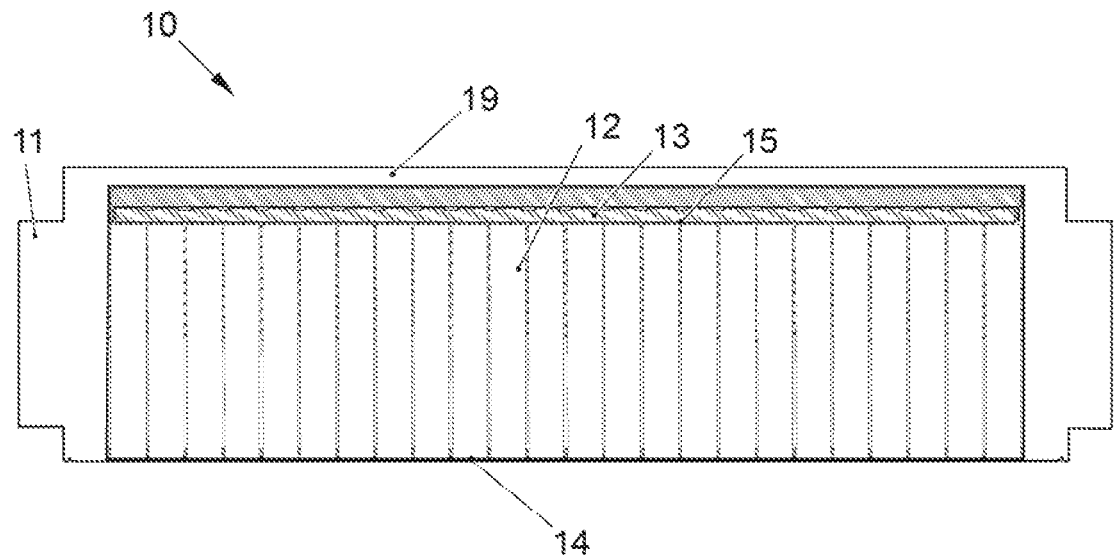
FIG. 2 shows the longitudinal section through the battery module according to FIG. 1.

FIGS. 1 and 2 illustrate the basic design of a battery module (10) according to aspects of the invention, for a traction battery (not shown in its entirety in the drawings). In an initially conventional way, the battery module (10) has a multiplicity of battery cells (12) which are arranged inside its housing (11) and which stand on a common lower-side support face (14) for the cooling plate of the traction battery. A power electronics circuit board (13), which is separated from the battery cells (12) only by a heat-conducting element (15) which is comb-shaped in profile runs between battery cells (12) and cover (19) of the housing (11).

Figure 3:
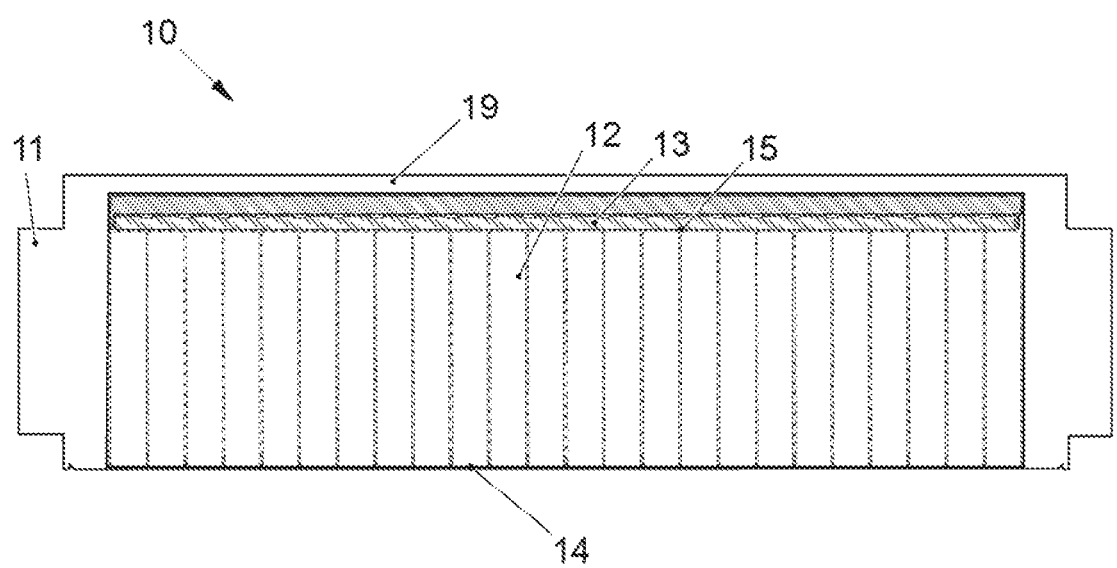
FIG. 3 shows the corresponding longitudinal section through a second battery module.

In the configuration according to FIG. 2, the extensions of this heat-conducting element (15) extend along the entire lateral face of the battery cells (12) in the direction of the support face (14) which serves as a housing floor. As is clarified by FIG. 3, in an alternative embodiment the extensions may nevertheless only cover part of this face without departing from the scope of the invention.

Figure 4:
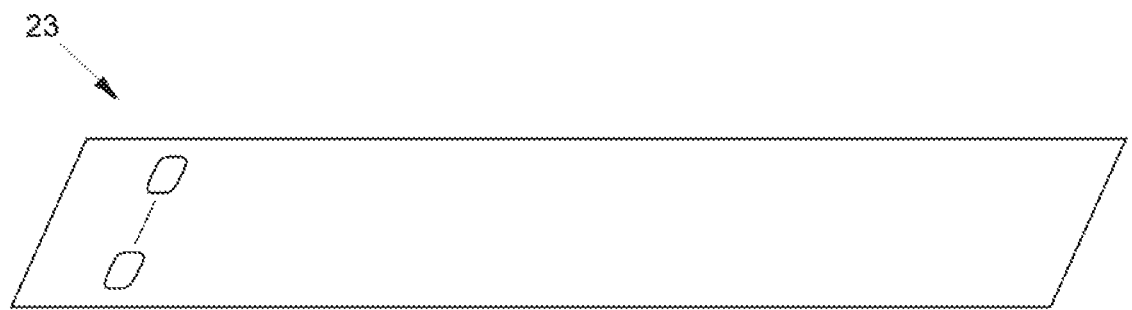
FIG. 4 shows the perspective view of a thermally conductive piece of sheet metal.
Figure 5:
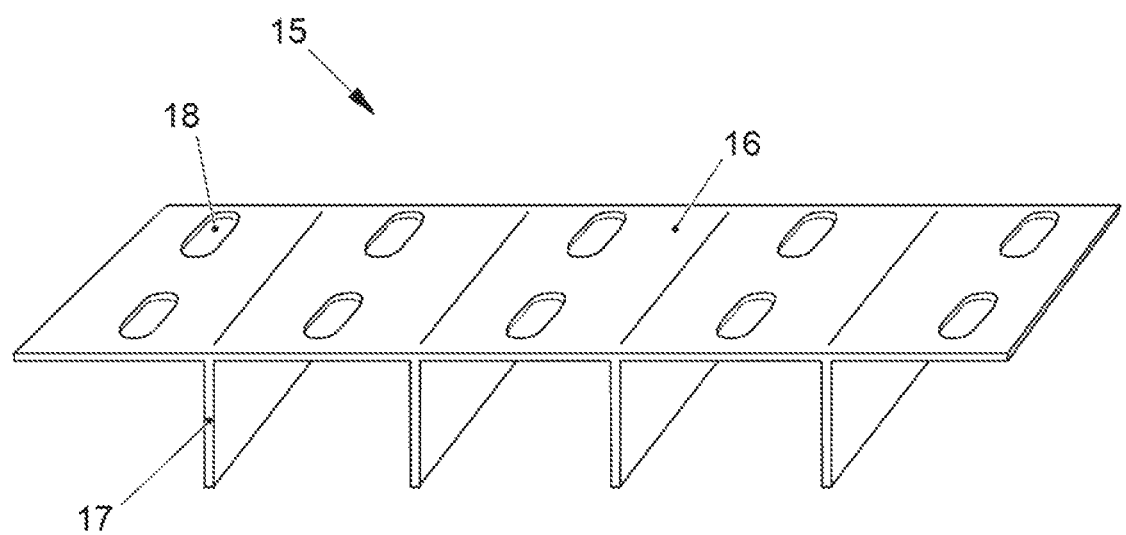
FIG. 5 shows the perspective view of a first heat-conducting element.

FIGS. 4 and 5 illustrate the solution as a particular embodiment of a sheet-metal bent part. The piece of sheet metal (23)—which is preferably rolled from a material with a good thermal conductivity such as aluminum or copper— is shaped here by a punch-bending process which will be described below, in such a way that a surface (16) is produced to which the power electronics circuit board (13) can be thermally coupled, and projections (17) are formed which extend between the battery cells (12) and which transport heat into the battery cells (12) over a large area, and at the same time via the projections (17) in the direction of the support face (14) which mostly extends on the underside of the battery module (10).

Figure 6:
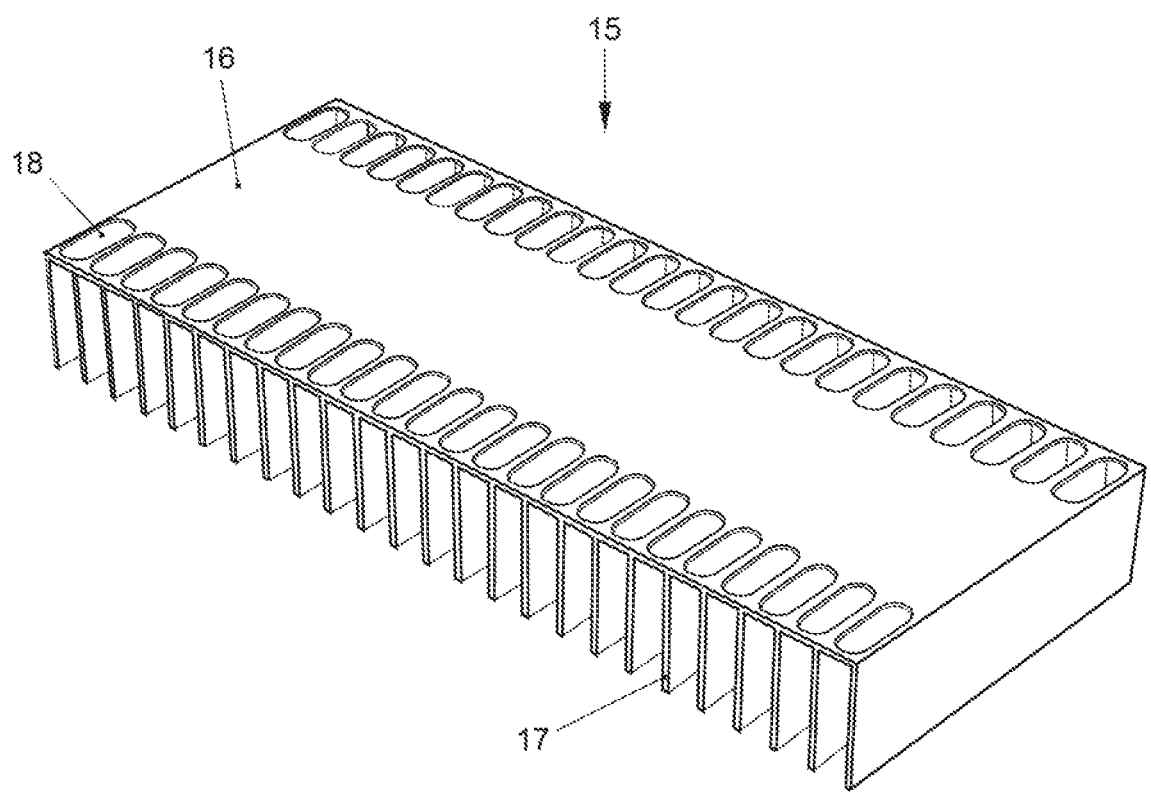
FIG. 6 shows the perspective view of a second heat-conducting element.
Figure 7:
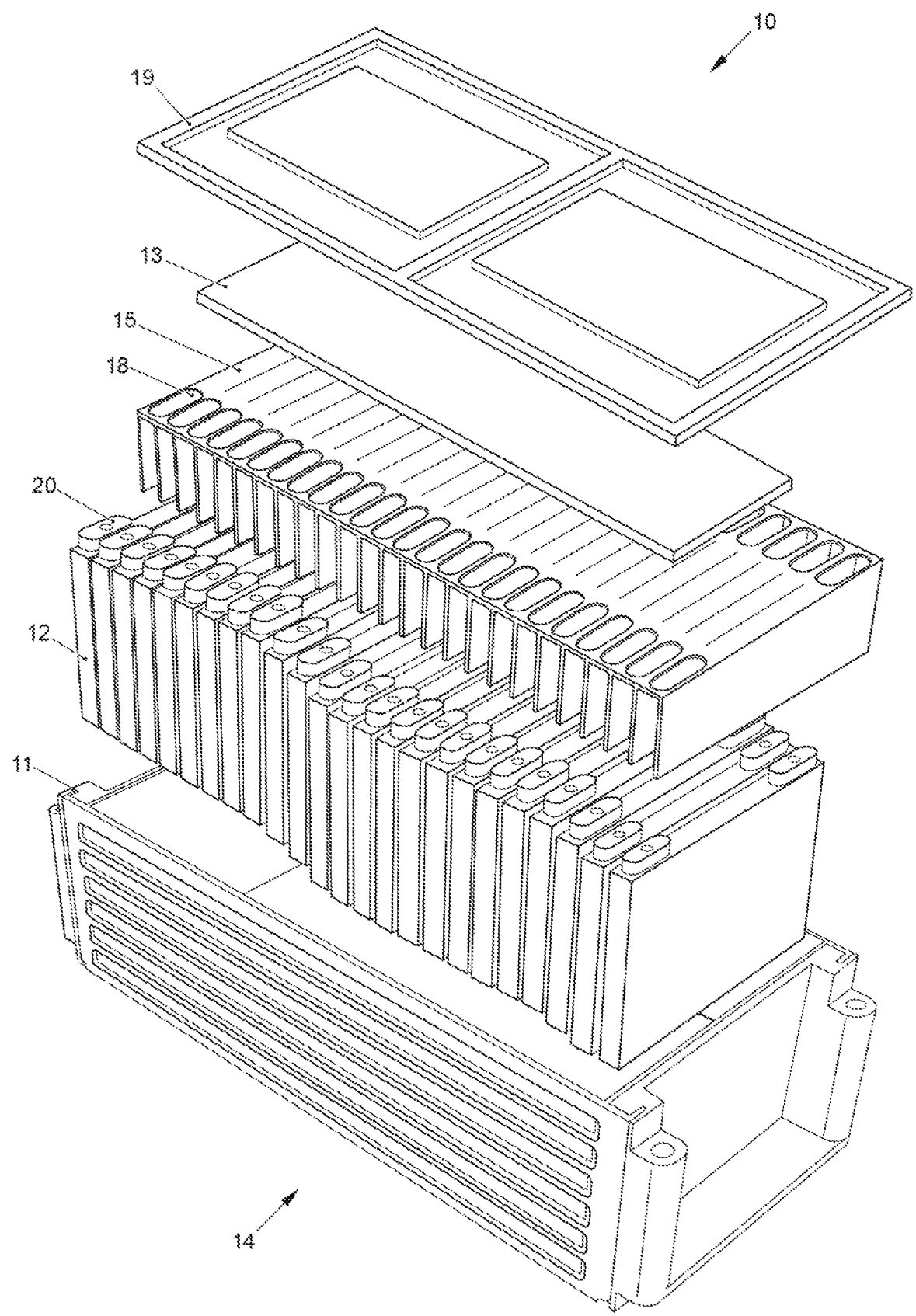
FIG. 7 shows an exploded illustration of the battery module according to FIG. 1.
Figure 8:
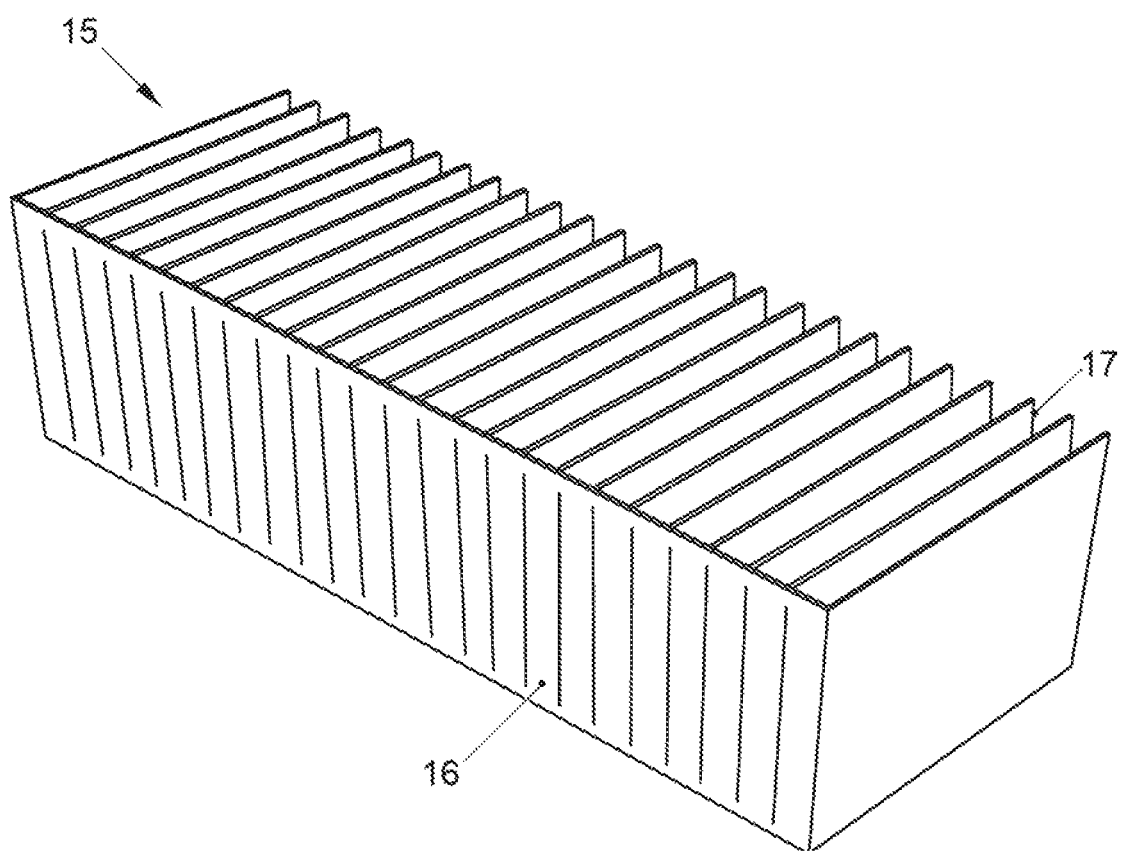
FIG. 8 shows the perspective view of a third heat-conducting element.
Figure 9:
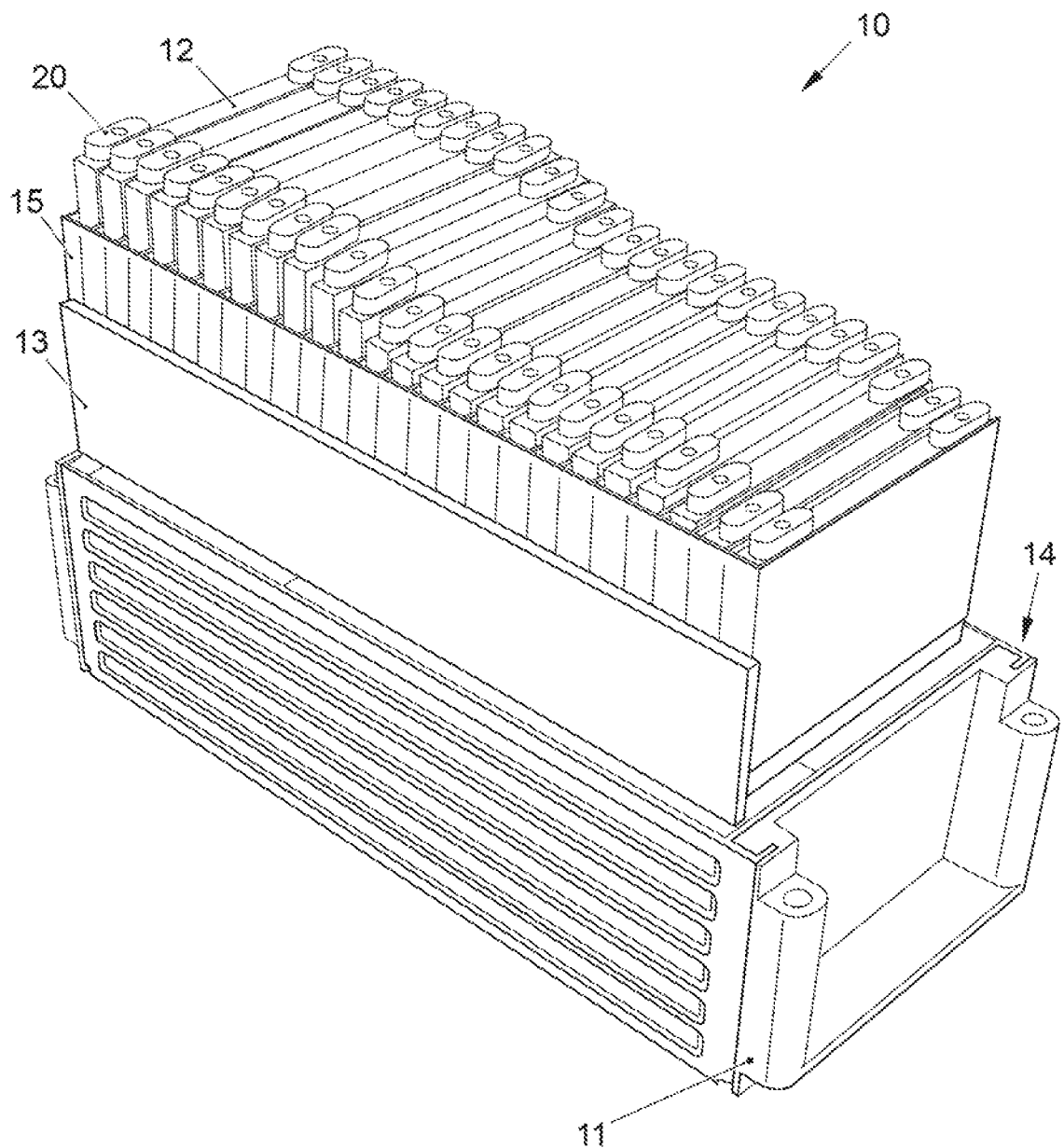
FIG. 9 shows the exploded illustration of a third battery module.

Consideration of FIGS. 6 and 7 together shows the purpose of the cutouts (18), already indicated in FIG. 5, in the surface (16): in the depicted variant the cutouts (18) serve to lead through in each case two connections (20)— inter alia screw connections or welded connections are possible—of the individual battery cells (12). In an alternative lateral arrangement (outlined in FIGS. 8 and 9) of the power electronics circuit board (13) these cutouts (18) may, however, be dispensed with insofar as cooling of the underside of the battery module (10) is also provided here.

A very thin coating of a material which is preferably a good thermal conductor serves, for example, to electrically insulate the heat-conducting element (15), which coating should electrically insulate with respect to at least the locally occurring voltages. A wide variety of polymers such as poly-ether-ether-ketone, polyurethane, polyamide, polyimide, teflon and epoxide with a typical dielectric strength between $$10 \frac{kV}{mm} \text{ and } 100 \frac{kV}{mm}$$

are possible as the coating material. In addition, a filling with aluminum oxide ($Al_2O_3$), zinc oxide (ZnO), zirconium oxide (ZrO), titanium dioxide ($TiO_2$) or some other material with a high thermal conductivity above $$10 \frac{W}{mK}$$

is preferably provided, such that the resulting composite material reaches a thermal conductivity above $$2 \frac{W}{mK}.$$

It is also possible to consider an inorganic, for example ceramic, coating which—if appropriate impregnated with plastic—is to be applied to the piece of sheet metal (23), preferably after the punch-bending process, in order to avoid damage.

Figure 10:
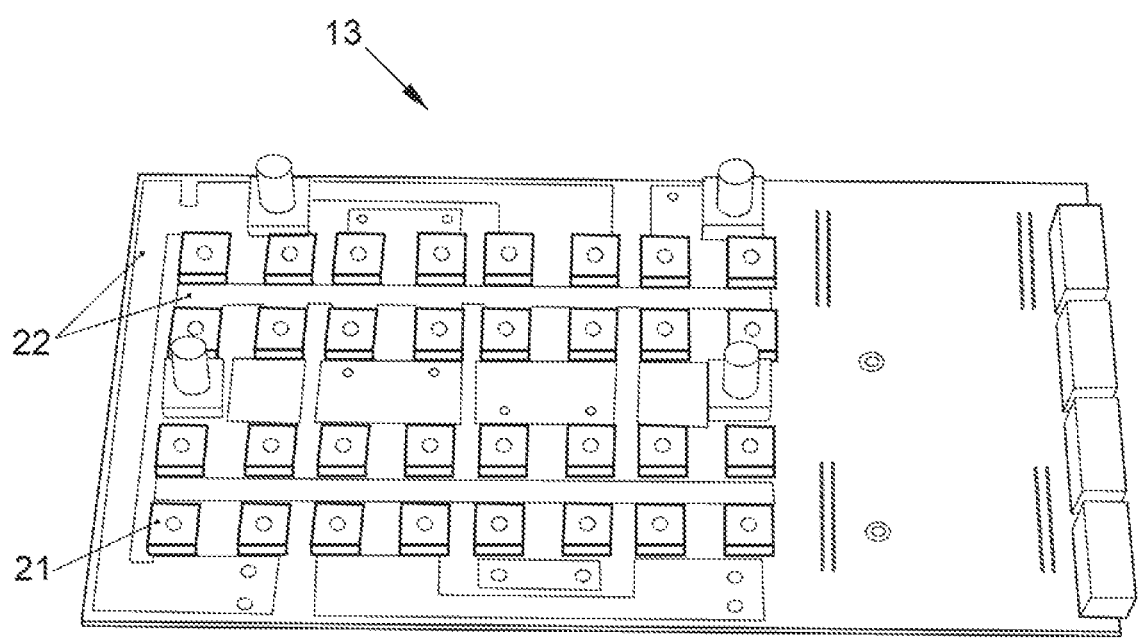
FIG. 10 shows the perspective view of a power electronics circuit board.

As FIG. 10 makes clear with the example of a power electronics circuit board (13) and its connection, the cooling of such electronics can take place in a plurality of ways, a number of which are described below. For example, power semiconductors (21) such as transistors can be placed in contact at their surface with the heat-conducting element (15). Various electronics components such as modern low-voltage power transistors are additionally configured in such a way that their heat can be drawn into the copper material via the electrical contacts. In this case, the heat can be transported from the copper of the power electronics circuit board (13) into the battery cells (12) via said heat-conducting element (15). The copper face (22) which is coated for this purpose can definitely be of the same height as the power semiconductors (21) here or can even project beyond them by virtue of its copper support.

Figure 11:
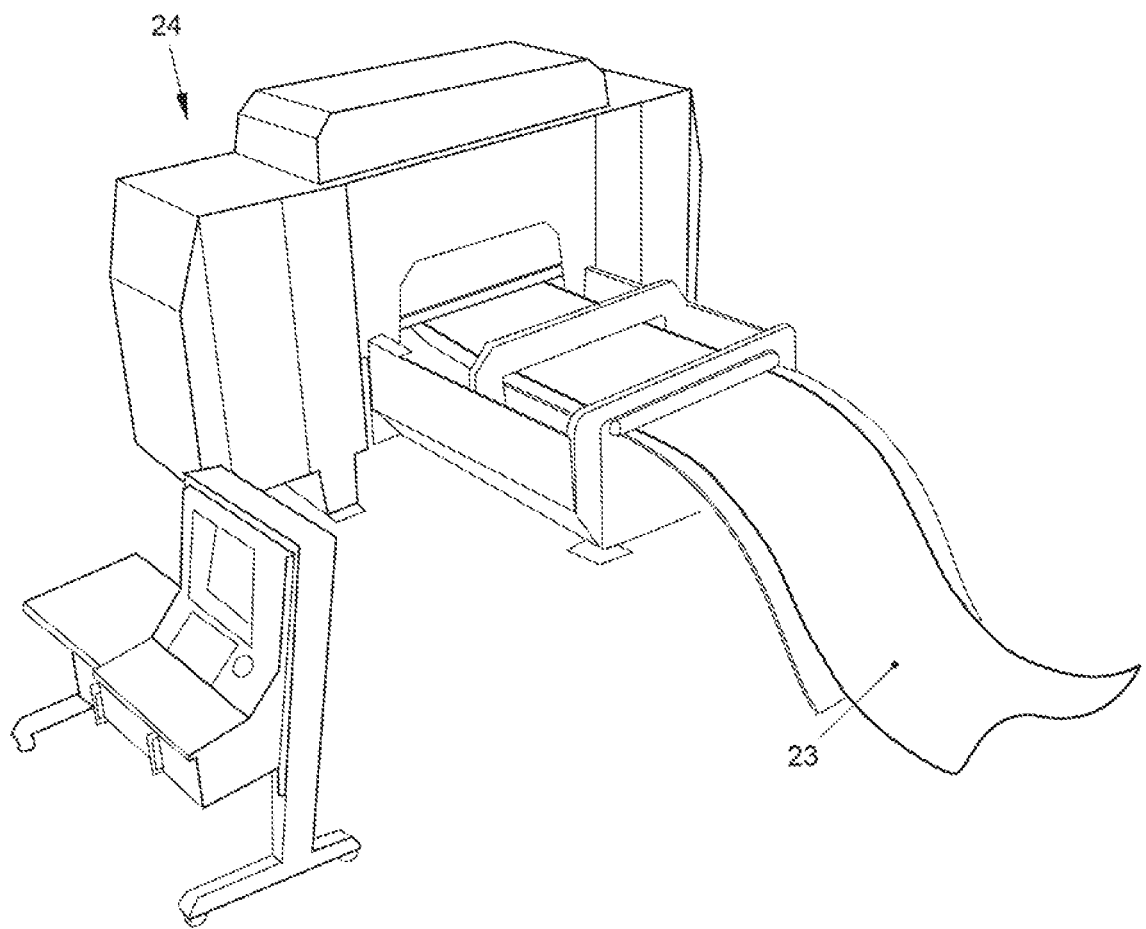
FIG. 11 shows the perspective view of a punch-bending die.
Figure 12:
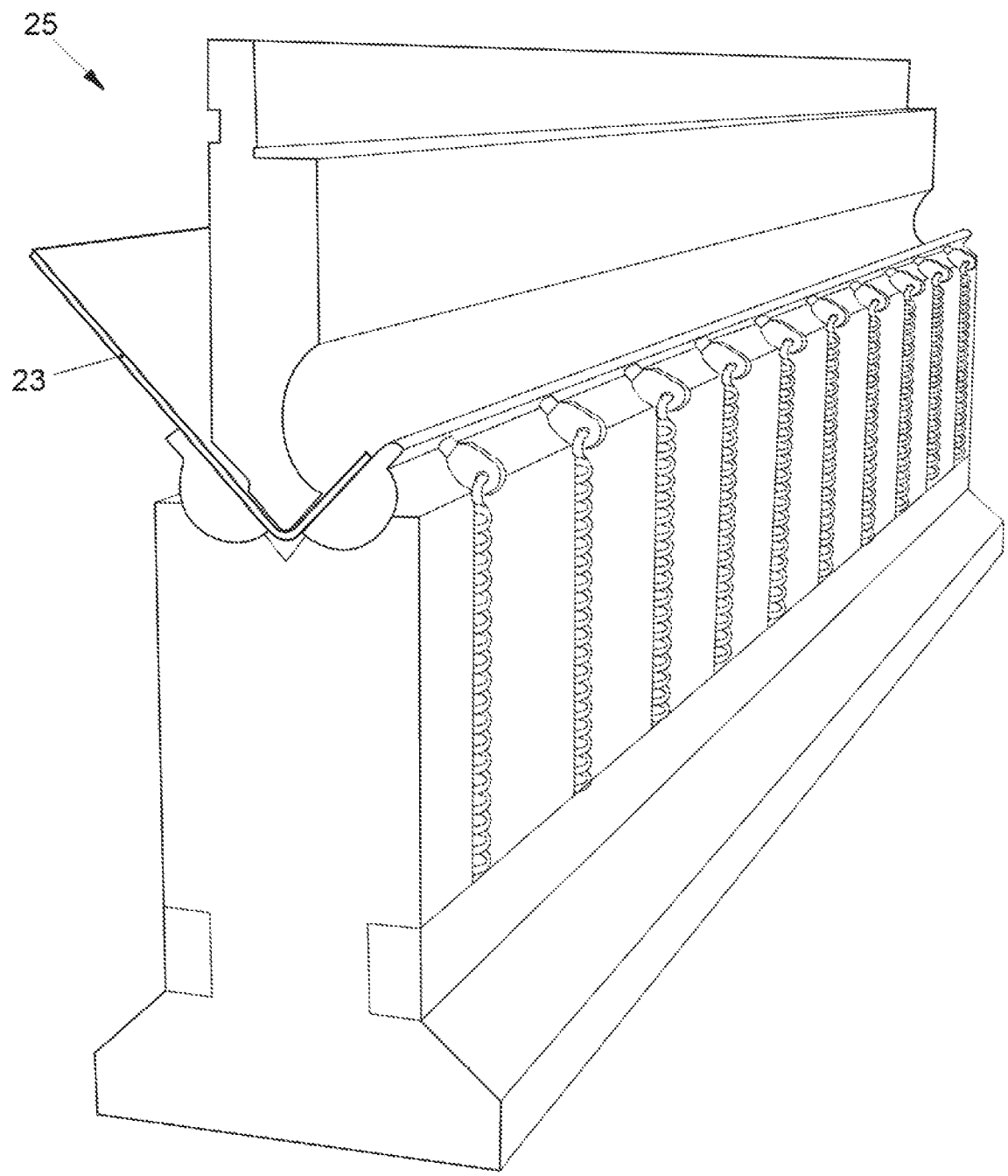
FIG. 12 shows the perspective view of a wedge-bending tool.

The manufacture (30) of the heat-conducting element (15) from one or more sheet-metal bent parts per battery module (10) can, for example, be carried out in a very cost-effective way by means of a punch-bending die (24) of the design shown in FIG. 11. The shaping of the projections (17) then takes place—as represented in FIG. 12—for example by means of what is referred to as V bending or wedge bending (25). Any projections (17) on the outer edges of the heat-conducting element (15) can be shaped by edge bending.

Figure 13:
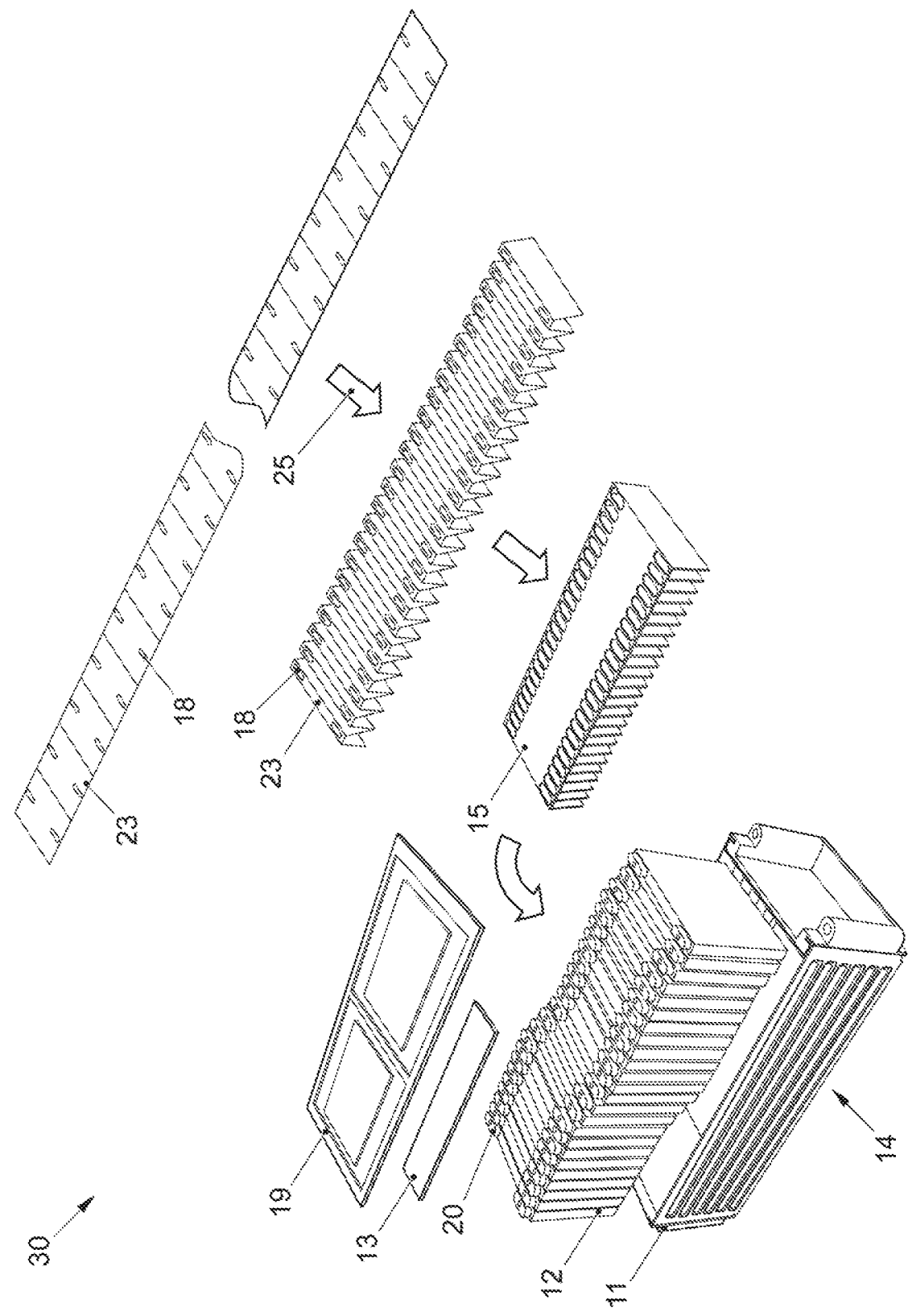
FIG. 13 shows a schematic view of the manufacture of a fourth battery module.

The outer edges and all the necessary cutouts (18), in order, for example, to lead screw connections or connections (20) of the battery cells (12) through the heat-conducting element (15) to the power electronics circuit board (13) or to cut out elements on the power electronics circuit board (13) with a relatively large structural height out of the heat-conducting element (15), can preferably be punched. If bending in this way is combined with punching, the cutouts (18) which can already be seen in FIG. 13 and outer edges of the piece of sheet metal (23) are not yet present before it passes through the press.

What is claimed is:

1. A battery module for a traction battery, the battery module comprising:
   a housing,
   battery cells arranged inside of the housing,
   a power electronics circuit board adjacent to the battery cells,
   a support face of the housing upon which the battery cells are mounted, and
   a heat-conducting element having (i) a heat-conducting surface that is mounted in thermal contact with and between the power electronics circuit board and the battery cells for transferring thermal energy from the power electronics circuit board to the battery cells, and (ii) projections extending from the heat-conducting surface, each projection running between adjacent battery cells in the direction toward the support face.

2. The battery module as claimed in claim 1, wherein the projections are integrally formed onto the heat-conducting surface of the heat-conducting element, and wherein the projections run plane-parallel with respect to one another and at a right angle to the heat-conducting surface of the heat-conducting element.

3. The battery module as claimed in claim 1, wherein the battery cells have connections, and the heat-conducting surface has cutouts for leading through the connections to the power electronics circuit board.

4. The battery module as claimed in claim 2, wherein the connections of the battery cells are either screw-type connections or welded connections.

5. The battery module as claimed in claim 1, wherein the housing comprises a cover and the support face extends opposite to the cover.

6. The battery module as claimed in claim 1, wherein the power electronics circuit board has power semiconductors and a coated copper face, and the heat-conducting element bears on the copper face.

7. The battery module as claimed in claim 1, wherein the heat-conducting element comprises copper or the heat-conducting element comprises aluminum.

8. The battery module as claimed in claim 1, wherein the heat-conducting element has a thermally conductive, electrically insulating coating and the coating comprises an organic polymer or a ceramic material.

9. The battery module as claimed in claim 1, wherein the heat-conducting element covers more than two side faces of the battery cells or the heat-conducting element runs between more than two battery cells.

10. A traction battery having the battery module as claimed in claim 1.

11. An electric car having the traction battery as claimed in claim 10.

12. The battery module as claimed in claim 3, wherein the cutouts are disposed between respective adjacent projections of the heat-conducting element.

13. The battery module as claimed in claim 3, wherein each battery cell includes two connections on opposing side of the battery cell, and the heat-conducting surface has cutouts for accommodating both connections of each battery cell.

14. The battery module as claimed in claim 3, wherein, for each battery cell, the connection extends above a top surface of the battery cell, an underside of the heat-conducting surface is positioned directly against the top surface of the battery cell, and the connection extends through a thickness of the heat-conducting surface.

15. The battery module as claimed in claim 1, wherein the heat-conducting surface is directly mounted in thermal contact with and between both the power electronics circuit board and the battery cells.

16. The battery module as claimed in claim 1, wherein the heat-conducting surface is sandwiched between the power electronics circuit board and the battery cells.

* * * * *